US012572339B2

US 12,572,339 B2

(12) United States Patent
Imai et al.

(10) Patent No.: US 12,572,339 B2
(45) Date of Patent: Mar. 10, 2026

(54) ACCELERATE INFERENCE PERFORMANCE ON ARTIFICIAL INTELLIGENCE ACCELERATORS

(71) Applicant: INTERNATIONAL BUSINESS MACHINES CORPORATION, Armonk, NY (US)

(72) Inventors: Haruki Imai, Yokohama (JP); Yasushi Negishi, Machida (JP); Tung D. Le, Ichikawa (JP); Kiyokuni Kawachiya, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 18/320,975

(22) Filed: May 20, 2023

(65) Prior Publication Data

US 2024/0385882 A1 Nov. 21, 2024

(51) Int. Cl.
| | |
|---|---|
| *G06F 8/41* | (2018.01) |
| *G06F 8/35* | (2018.01) |
| *G06F 9/50* | (2006.01) |

(52) U.S. Cl.
CPC .............. *G06F 8/433* (2013.01); *G06F 8/35* (2013.01); *G06F 8/4441* (2013.01); *G06F 8/451* (2013.01); *G06F 9/5033* (2013.01); *G06F 9/5066* (2013.01)

(58) Field of Classification Search
None
See application file for complete search history.

(56) References Cited

U.S. PATENT DOCUMENTS

| | | | |
|---|---|---|---|
| 2017/0124451 A1* | 5/2017 | Barham ................... | G06N 3/08 |
| 2018/0018586 A1 | 1/2018 | Kobayashi | |

(Continued)

FOREIGN PATENT DOCUMENTS

| | | |
|---|---|---|
| AU | 2022203628 A1 | 12/2022 |
| DE | 102022113059 A1 | 12/2022 |
| WO | 2024/240436 A1 | 11/2024 |

OTHER PUBLICATIONS

Pal, S. et al., "OnSRAM: Efficient Inter-Node On-Chip Scratchpad Management in Deep Learning Accelerators", Comput. Syst. (2022), vol. 21:6, 29 pgs.

(Continued)

*Primary Examiner* — Qing Chen
(74) *Attorney, Agent, or Firm* — CHIP LAW GROUP

(57) ABSTRACT

A method for inference performance in an artificial intelligence model provides reduction of pre-processing overhead. The method includes receiving a plurality of operations associated with the artificial intelligence model. A computational graph for the artificial intelligence model is generated. Each of the operations is categorized into one of three categories including: accelerator designated operations, central processing unit (CPU) designated operations, and undetermined processing designated operations. An estimated processing time is determined for the operations. The operations are inserted into the computational graph. The computational graph is divided into sub-graphs. Edges of the sub-graphs where pre-processing steps will be performed is determined. A conversion is applied to the sub-graphs converting the undetermined processing designated operations, into one of the accelerator designated operations or the CPU designated operations, based on a condition that minimizes a number of the pre-processing steps in the sub-graph.

20 Claims, 13 Drawing Sheets

(56) References Cited

U.S. PATENT DOCUMENTS

| | | | |
|---|---|---|---|
| 2020/0342286 A1* | 10/2020 | Zhang | G06F 9/5066 |
| 2021/0142177 A1 | 5/2021 | Mallya | |
| 2021/0248002 A1* | 8/2021 | Li | G06F 9/5027 |
| 2021/0374554 A1 | 12/2021 | Khandelwal | |

OTHER PUBLICATIONS

Zhang, M. et al., "DL Inference and Training Optimization Towards Speed and Scale", ACM (2021), Abstract, 1 pg.

Zhang, M. et al., "DUET: A Compiler-Runtime Subgraph Scheduling Approach for Tensor Programs on a Coupled CPU-GPU Architecture", IEEE International Parallel and Distributed Processing Symposium (2021), 11 pgs.

Xu, Y. et al., "EOP: Efficient Operator Partition for Deep Learning Inference Over Edge Servers", ACM (2022), pp. 45-57.

Chen, J., "Update Output for Quantized Models by ORT on VNNI Machine (#572)", Onnx Models (2022), 4 pgs.

Jain, A. et al., "SUPER: SUb-Graph Parallelism for TransformERs", IEEE International Parallel and Distributed Processing Symposium (2021), 10 pgs.

Abadi, M. et al., "TensorFlow: Large-Scale Machine Learning on Heterogeneous Distributed Systems", ARXIV.org (2016), 19 pgs.

International Search Report and Written Opinion issued Jun. 24, 2024 in related application No. PCT/EP2024/061189, 12 pgs.

"BERT-Squad", Retrieved from: https://github.com/onnx/models/tree/main/text/machine_comprehension/bert-squad, 2023, 4 pages.

* cited by examiner

*[Tcn, Tan]: estimated computation time on CPU and Accelerator*

Dnn: estimated preprocessing time

[Tcn, Tan]: estimated processing time on CPU and Accelerator

No
preprocessing

Single
preprocessing $$T = Dca1 + D24 + Ta1 + Ta2 + Tc4 + Tc5$$

ACCELERATE INFERENCE PERFORMANCE ON ARTIFICIAL INTELLIGENCE ACCELERATORS

BACKGROUND

Technical Field

The present disclosure generally relates to computing hardware, and more particularly, to accelerating inference performance on artificial intelligence accelerators.

Description of the Related Art

Artificial intelligence (AI) commonly uses deep learning models to construct outcomes. Deep learning models may be represented by a computational graph that includes nodes (representing computer operations; for example, convolutions or long-short term memory operations) and edges (representing data flow). Accelerators can be used in a deep learning compiler to accelerate AI inference in operations.

A deep learning compiler generally operates by reading a computational graph. For each operation, the compiler selects between a central processing unit (CPU) or an accelerator to execute the operation. The selected unit (accelerator or CPU) is then used by the compiler to generate code for the operation.

Conventionally, a compiler selects the accelerator for all operations if the operations are supported by the accelerator. For an accelerator to process the data, the data must be in a format compatible for acceleration. Any collateral sources of processing overhead are usually not considered when the compiler chooses between using the accelerator or CPU. For example, when data is being processed by one execution unit and then by the other type (by CPU to accelerator and vice versa), pre-processing must be performed to convert the data for reading by either the accelerator or the CPU.

SUMMARY

The embodiments in general provide an improvement for inference performance in an artificial intelligence model by determining when some operations that may be performed by either an accelerator or a CPU should be designated for processing by one or the other based on minimizing pre-processing data conversions. The embodiments transform operation nodes in a computational graph so that more operation nodes are processed by the same unit processing type (accelerator or CPU) when receiving data from a preceding operation or when transferring data to a proceeding operation. Matching processing unit types between operation lessens the pre-processing overhead used in an artificial intelligence model.

According to an embodiment of the present disclosure, a computer program product for inference performance in an artificial intelligence model includes one or more computer readable storage media, and program instructions collectively stored on the one or more computer readable storage media. The program instructions include receiving, by a processor, a plurality of operations associated with the artificial intelligence model. A computational graph for the artificial intelligence model is generated. Each of the operations is categorized into one of three categories including: accelerator designated operations, central processing unit (CPU) designated operations, and undetermined processing designated operations. An estimated processing time is determined for each of the plurality of operations. The plurality of operations is inserted into the computational graph. The computational graph is divided into sub-graphs. Edges of the sub-graphs where pre-processing steps will be performed is determined. A conversion is applied to one or more of the sub-graphs converting the undetermined processing designated operations, into one of the accelerator designated operations or the CPU designated operations, based on a condition that minimizes a number of the pre-processing steps in the sub-graph.

In one embodiment, which may be combined with the preceding embodiment, the dividing of the computational graph into sub-graphs is performed at a point in the computational graph where one of the accelerator designated operations or the CPU designated operations is adjacent one of the undetermined processing designated operations. It will be appreciated that breaking up the computational graph into sub-graphs allows the process to identify where pre-processing data points may be appropriate and the undetermined operations transformed to eliminate or minimize the pre-processing data points.

According to an embodiment of the present disclosure, a method for inference performance in an artificial intelligence model includes receiving, by a processor, a plurality of operations associated with the artificial intelligence model. A computational graph for the artificial intelligence model is generated. Each of the operations is categorized into one of three categories including: accelerator designated operations, central processing unit (CPU) designated operations, and undetermined processing designated operations. An estimated processing time is determined for each of the plurality of operations. The plurality of operations is inserted into the computational graph. The computational graph is divided into sub-graphs. Edges of the sub-graphs where pre-processing steps will be performed are determined. A conversion is applied to one or more of the sub-graphs converting the undetermined processing designated operations, into one of the accelerator designated operations or the CPU designated operations, based on a condition that it substantially reduces (e.g., minimizes) a number of the pre-processing steps in the sub-graph.

In one embodiment, which may be combined with the preceding embodiment, the method includes converting all the undetermined processing designated operations in a sub-graph into the accelerator designated operation on the condition that the sub-graph includes vertices that are both the accelerator designated operations. A similar embodiment converts all the undetermined processing designated operations in a sub-graph into the CPU designated operation when the vertices of the sub-graph are both CPU designated operations. These embodiments eliminate any need for a pre-processing point in that section of the computational graph, thereby readily eliminating some processing overhead.

According to an embodiment of the present disclosure, a computing device for inference performance in an artificial intelligence model includes a processor and a memory coupled to the processor. The memory stores instructions to cause the processor to perform acts including receiving a plurality of operations associated with the artificial intelligence model. A computational graph for the artificial intelligence model is generated. Each of the operations is categorized into one of three categories including: accelerator designated operations, central processing unit (CPU) designated operations, and undetermined processing designated operations. An estimated processing time is determined for each of the plurality of operations. The plurality of operations is inserted into the computational graph. The computational graph is divided into sub-graphs. Edges of the sub-graphs where pre-processing steps will be performed are determined. A conversion is applied to one or more of the sub-graphs converting the undetermined processing designated operations, into one of the accelerator designated operations or the CPU designated operations, based on a condition that minimizes a number of the pre-processing steps in the sub-graph.

In one embodiment, which may be combined with the preceding embodiment the undetermined processing designated operations in a sub-graph are converted so that only a single one of the accelerator designated operations is adjacent a single one of the CPU designated operations, under the condition that the sub-graph includes vertices that include one accelerator designated operation and one CPU designated operation. Since the sub-graph will involve a pre-processing point somewhere along the computational path, the feature of this embodiment substantially reduces (e.g., minimizes) the number of pre-processing points (e.g., to the bare minimum) for the sub-graph, thereby reducing processing overhead substantially (e.g., to the minimum amount possible).

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
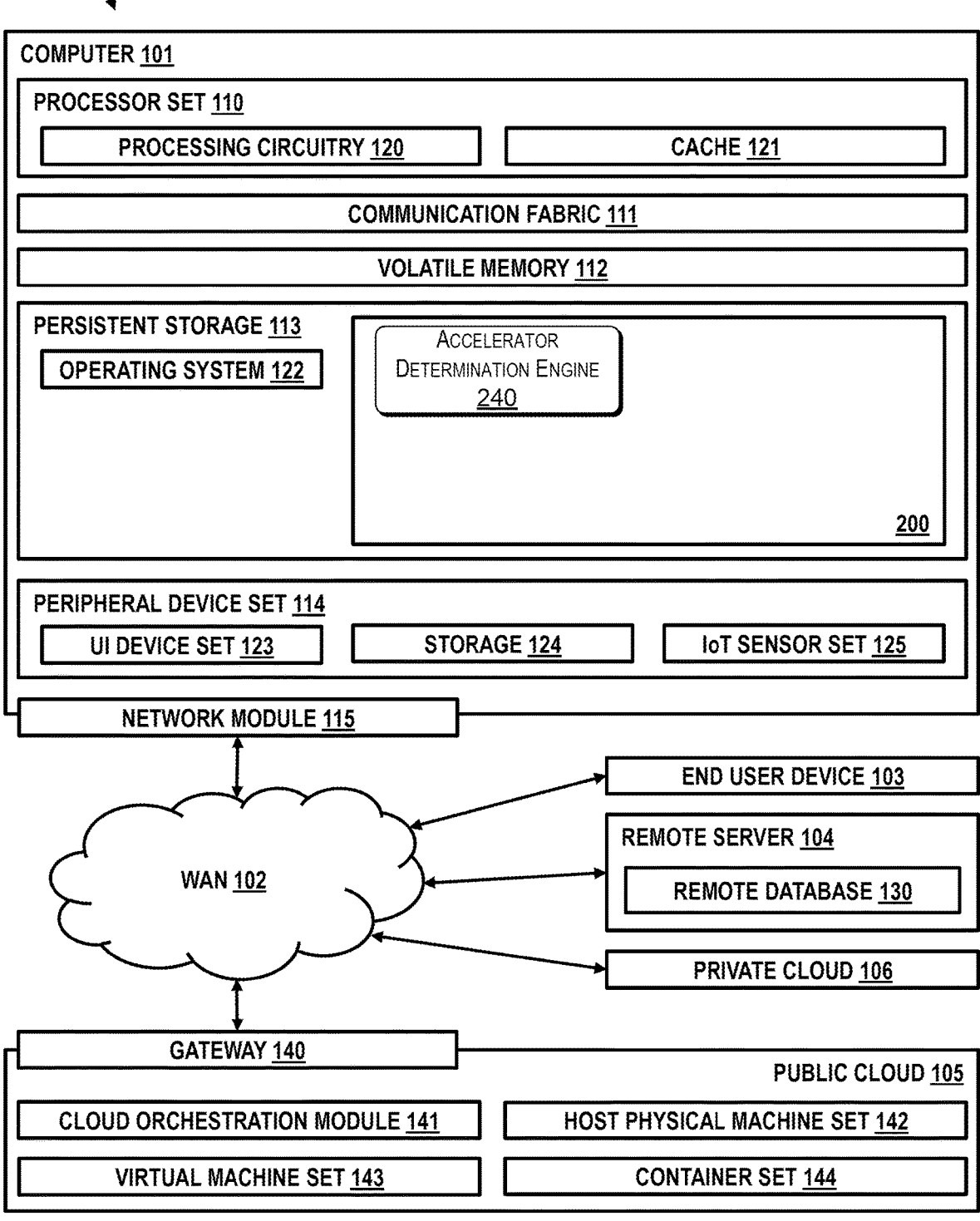
FIG. 1 is a block diagram of a computing environment for accelerating inference performance in an artificial intelligence model according to an embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Definitions

Accelerator as used herein, refers to a hardware device specialized for artificial intelligence or machine learning applications. In embodiments where the accelerator is a processing chip, the accelerator may be distinct from a computing system central processing unit (CPU).

Pruning as used herein refers to a technique that is used to reduce the size of the search space by discarding branches that are not worth exploring further by setting constraints.

Processor as used herein refers a computing chip designed to process computing instructions.

Engine as used herein refers to software and/or hardware module that executes the foundation or crucial task for other programs.

Model as used herein refers to a computing process used to predict outcomes by analyzing patterns in a given set of input data.

Overview

The present disclosure generally relates to systems and methods for accelerating inference processing performance in artificial intelligence (AI) modeling. In typical AI compiling, accelerators are used to improve processing time. Generally speaking, compilers default to using the accelerator if an operation is supported by the accelerator without regard to the overhead associated with pre-processing the data. To use an accelerator, data preprocessing is used for the accelerator to read and generate code associated with the operation under acceleration. Similarly, when an operation can be executed by a CPU and the preceding operation was handled by the accelerator, the data being transferred involves pre-processing the data for readability by the CPU (or GPU in some instances). When operations are executed back and forth between a CPU and the accelerator, the pre-processing becomes a significant expenditure of processing overhead. The pre-processing overhead eats into the time gained from using an accelerator and the inference performance in the system becomes inefficient.

The present disclosure provides an improvement in inference performance within an AI process. Exemplary embodiments select the unit for processing an operation in a model based on minimizing the amount of pre-processing used in the model. As will be seen, operations in a group will be categorized as being pre-designated for processing by the CPU, processing by the accelerator, or undetermined for which unit to process the data. The "undetermined" operations will be later determined for designation to be processed by the CPU or accelerator depending on which designation provides the least amount of pre-processing for the group of operations. It will be appreciated that, in one aspect, the subject disclosure improves the performance of computing technology by eliminating processing overhead, which provides faster computing times and computing power expenditure.

Example Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 includes an example of an environment for the execution of at least some of the computer code involved in performing the inventive methods, such as the improved interpretable prediction code 200. The improved interpretable prediction code 200 may include a plurality of code sub-programs or modules. For example, some embodiments include an accelerator determination engine 240 that determines which processing unit (for example, CPU or accelerator) to use for one or more operations in an AI process. The accelerator determination engine 240 may operate according to one or more of the methods disclosed in further detail below. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. For the instant disclosure, the processor set 110 includes for example a central processing unit (CPU) and an accelerator. In some embodiments, a different type of processing element may be used instead of the CPU, (for example, a GPU or other process dedicated/specialized unit). Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Example System Architecture

Figure 2:
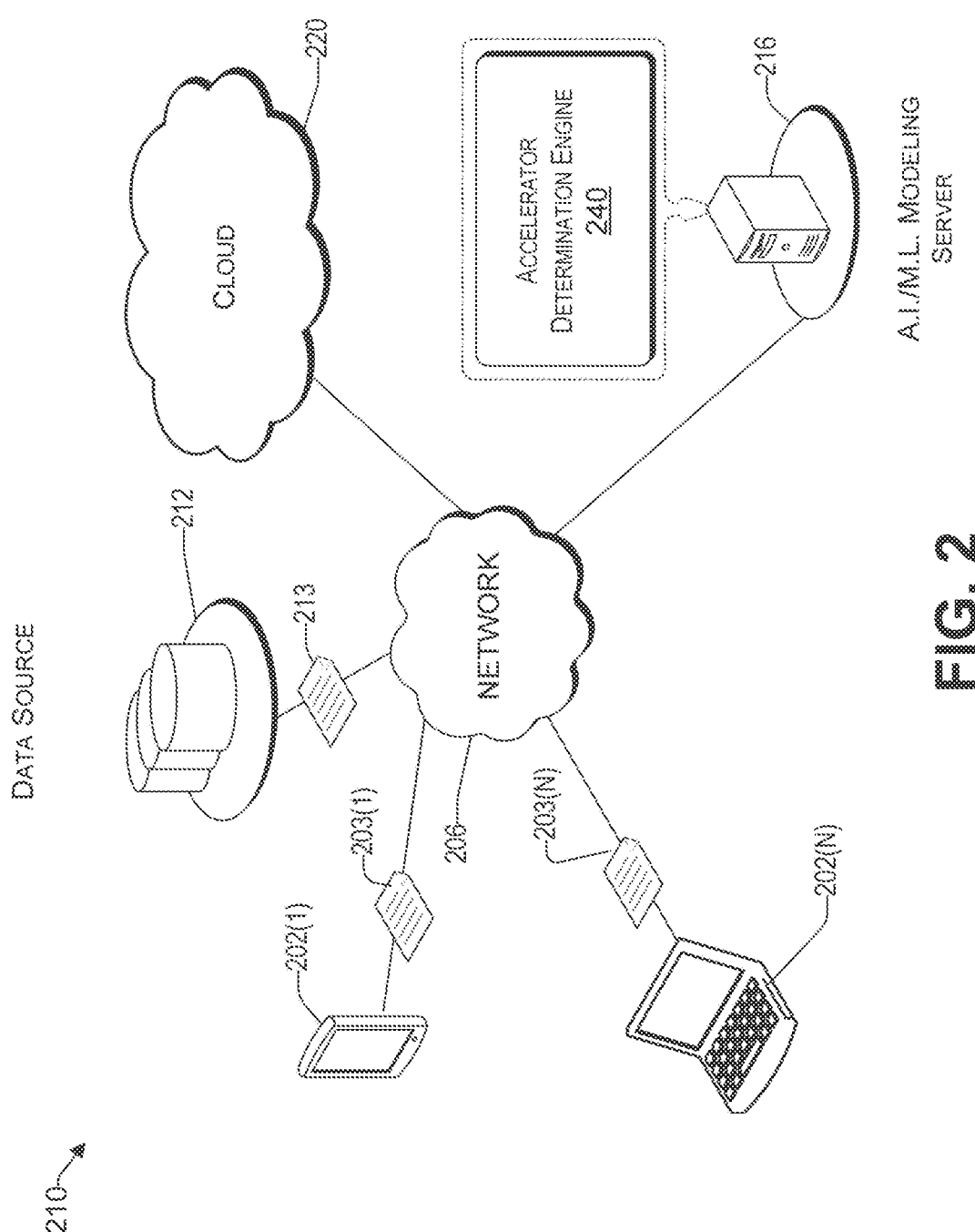
FIG. 2 is a block diagram of an architecture for accelerating inference performance in an artificial intelligence model according to an embodiment.

FIG. 2 illustrates an example architecture 210 for accelerating inference processing performance in AI modeling. Architecture 210 includes a network 206 that allows various computing devices 202(1) to 202(N) to communicate with each other, as well as other elements that are connected to the network 206, such as data source (or database) 212, an AI/machine learning (ML) modeling server 216, and the cloud 220. The computing devices 202(1) to 202(N) and AI/ML modeling server 216 may operate under the computing environment described above in FIG. 1. The AI/ML modeling server 216 may operate the code 200, including the module for the accelerator determination engine 240.

The network 206 may be, without limitation, a local area network ("LAN"), a virtual private network ("VPN"), a cellular network, the Internet, or a combination thereof. For example, the network 206 may include a mobile network that is communicatively coupled to a private network, sometimes referred to as an intranet that provides various ancillary services, such as communication with various application stores, libraries, and the Internet. The network 206 allows the accelerator determination engine 240, which is a software program running on the AI/ML modeling server 216, to communicate with the data source 212, computing devices 202(1) to 202(N), and/or the cloud 220, to provide data processing. The data source 212 may include source data being processed for inference and operations to be used in processing the source data, that will be processed under one or more techniques described here. In some embodiments, a data packet 213 may be received by the accelerator determination engine 240. This data packet 213 can be received by the accelerator determination engine 240 by either a push operation from the data source 212 or from a pull operation of the accelerator determination engine 240. In one embodiment, the data processing is performed at least in part on the cloud 220.

For purposes of later discussion, several user devices appear in the drawing, to represent some examples of the computing devices that may be the source of data being analyzed depending on the task chosen. Aspects of the symbolic sequence data (e.g., 203(1) and 203(N)) may be communicated over the network 206 with the accelerator determination engine 240 of the AI/ML modeling server 216. Today, user devices typically take the form of portable handsets, smart-phones, tablet computers, personal digital assistants (PDAs), and smart watches, although they may be implemented in other form factors, including consumer, and business electronic devices. While the data source 212 and the accelerator determination engine 240 are illustrated by way of example to be on different platforms, it will be understood that in various embodiments, the data source 212 and the AI/ML modeling server 216 may be combined. In other embodiments, these computing platforms may be implemented by virtual computing devices in the form of virtual machines or software containers that are hosted in a cloud 220, thereby providing an elastic architecture for processing and storage.

Example Methodology

Figure 3:
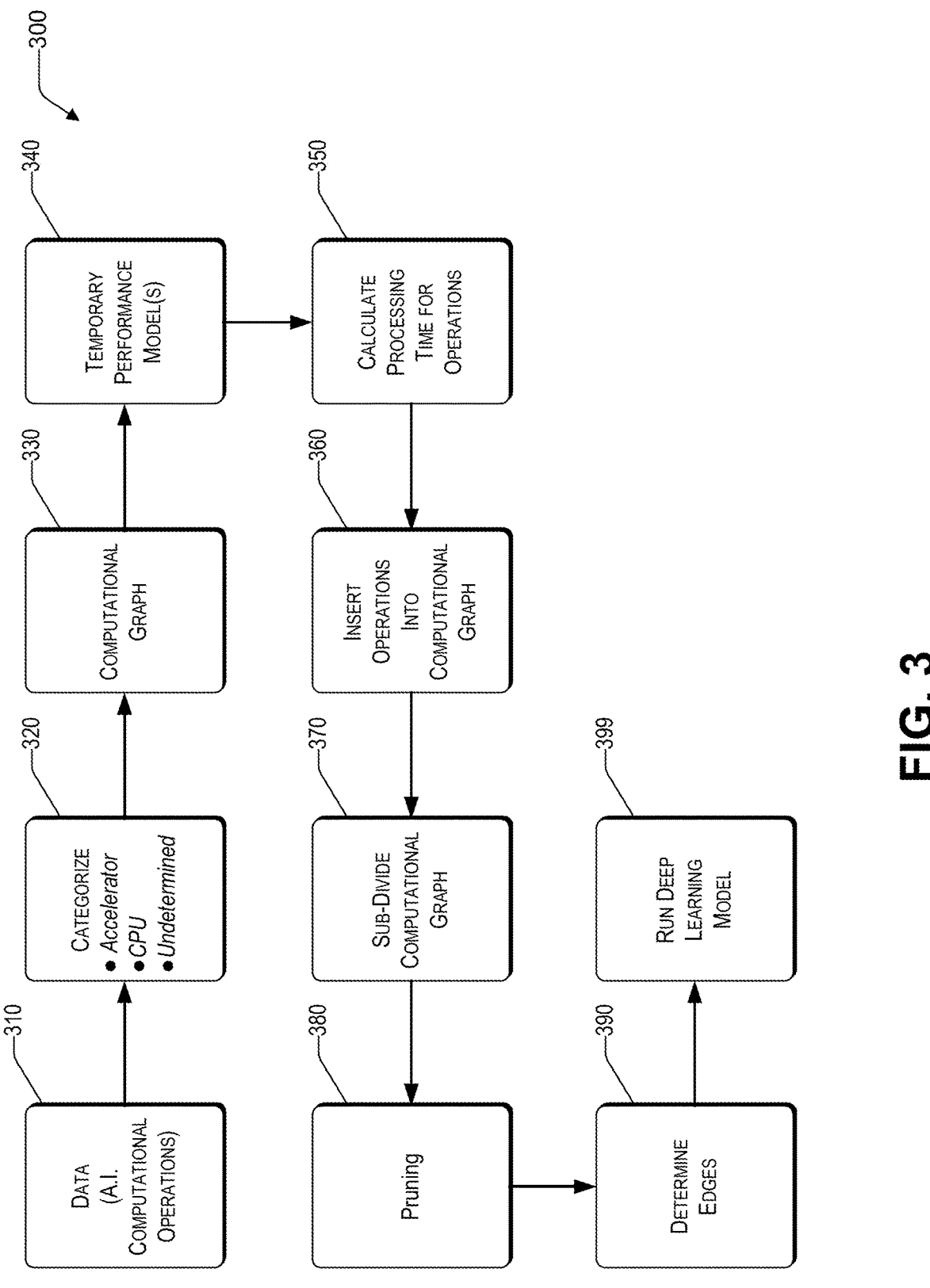
FIG. 3 is a flowchart of a method for accelerating inference performance in an artificial intelligence model according to some embodiments.

Reference now is made to FIG. 3, which illustrates a computer implemented process 300 (referred to herein as simply the "process 300") for accelerating inference processing performance in AI modeling, according to an illustrative embodiment. FIG. 3 will be disclosed with concurrent reference to depictions shown in FIGS. 4-6, 7A and 7B that illustrate examples of some of the actions described by FIG. 3. "Processor" as used when referring to FIG. 3 and associated figures, may refer to the CPU of a computing system or other non-accelerator type processing device.

As a preliminary act, the processor may receive 310 a plurality of operations associated with an artificial intelligence model. Each of the operations may be categorized 320 into one of three categories including: accelerator designated operations, CPU designated operations, and undetermined processing designated operations. In some embodiments, CPU designated operations may be performed by the same processor implementing the instant process 300.

Figure 4:
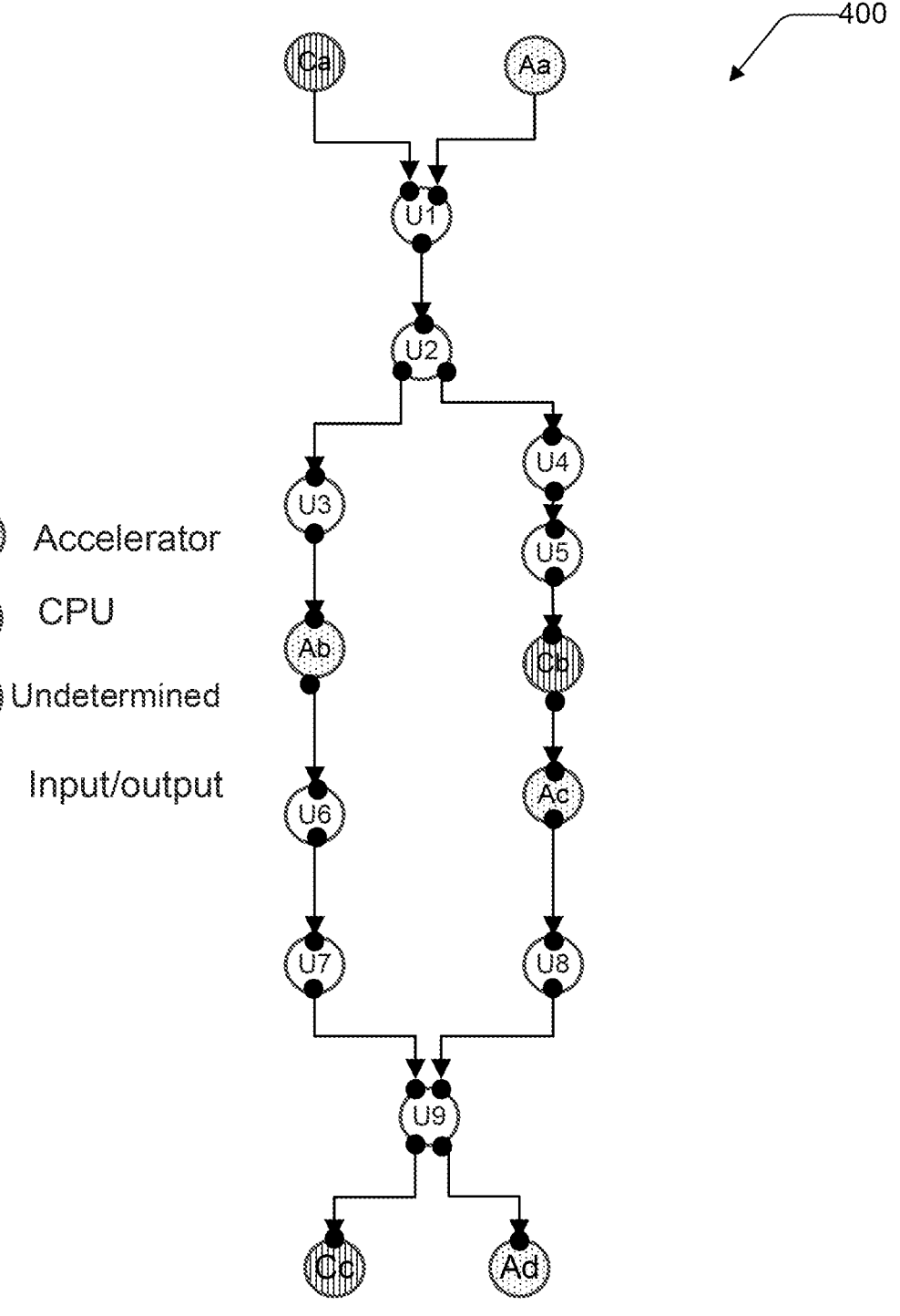
FIG. 4 is a diagrammatic view of a computational graph for an artificial intelligence process using hardware acceleration, consistent with embodiments.

The processor may generate 330 a computational graph for the AI model. FIG. 4 shows an example of a computational graph 400. As can be seen, each node represents one of three categorized options for performance of an operation. Nodes that are labeled with an "A" represent operations that are pre-designated for performance by the accelerator. Being pre-designated for performance by the accelerator may be determined by whether the execution time for the operation by the accelerator can be performed above a threshold factor faster than by the CPU (for example, 10 times faster). In some embodiments, when the pre-processing cost of an operation is negligible, the operation may be designated for operation by the accelerator. Operations that are not supported by the accelerator (for example, scan operations or transpose operations) may be pre-designated for performance by the CPU (labeled with a "C"). Operations which may be performed effectively on either the CPU or the accelerator may be pre-designated as undetermined (labeled as "U"). Some undetermined operations, may include those operations that can be performed on the accelerator, but the improvement in performance is not large or significant (for example, ADD or SUB operations).

Figure 5:
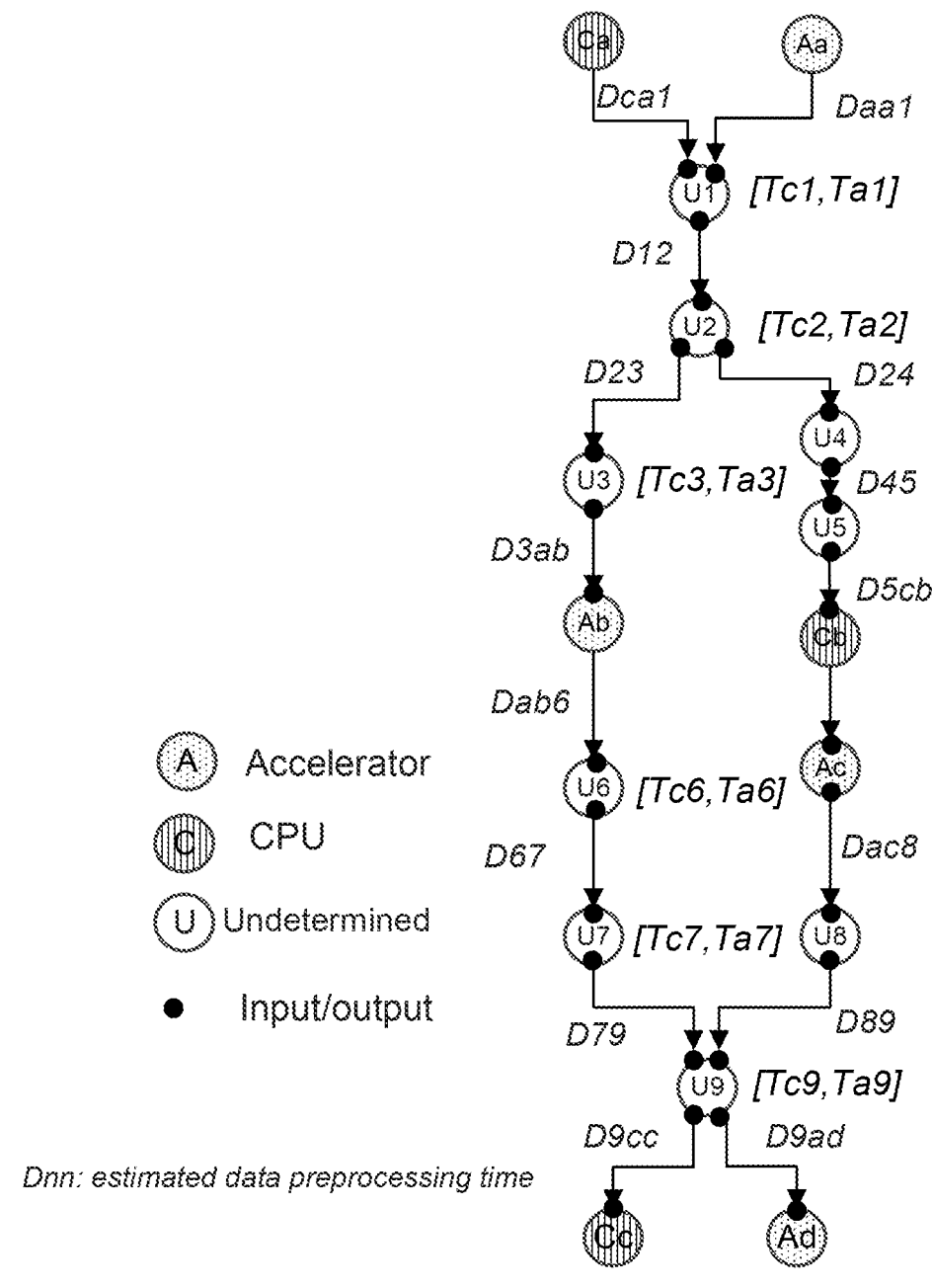
FIG. 5 is a diagrammatic view of a computational graph including associated computation times at nodes consistent with embodiments.

The processor may determine estimated computation times for operations and estimated preprocessing time on the edges in the computational graph. In some embodiments, a temporary performance model may be generated 340 to determine the estimated times. FIG. 5 shows an example performance model of the computational graph used in FIG. 4. The temporary performance model may be used to estimate (calculate) 350 a pre-processing time (D), a processing time on the CPU (Tc), and a processing time on the accelerator (Ta) for each operation type of the undetermined operations (for example, "Add", "Sub", etc.). The estimated times for operations may be determined by measuring performance using several input data sizes in advance. The operations may be inserted 360 into the computational graph.

Figure 6:
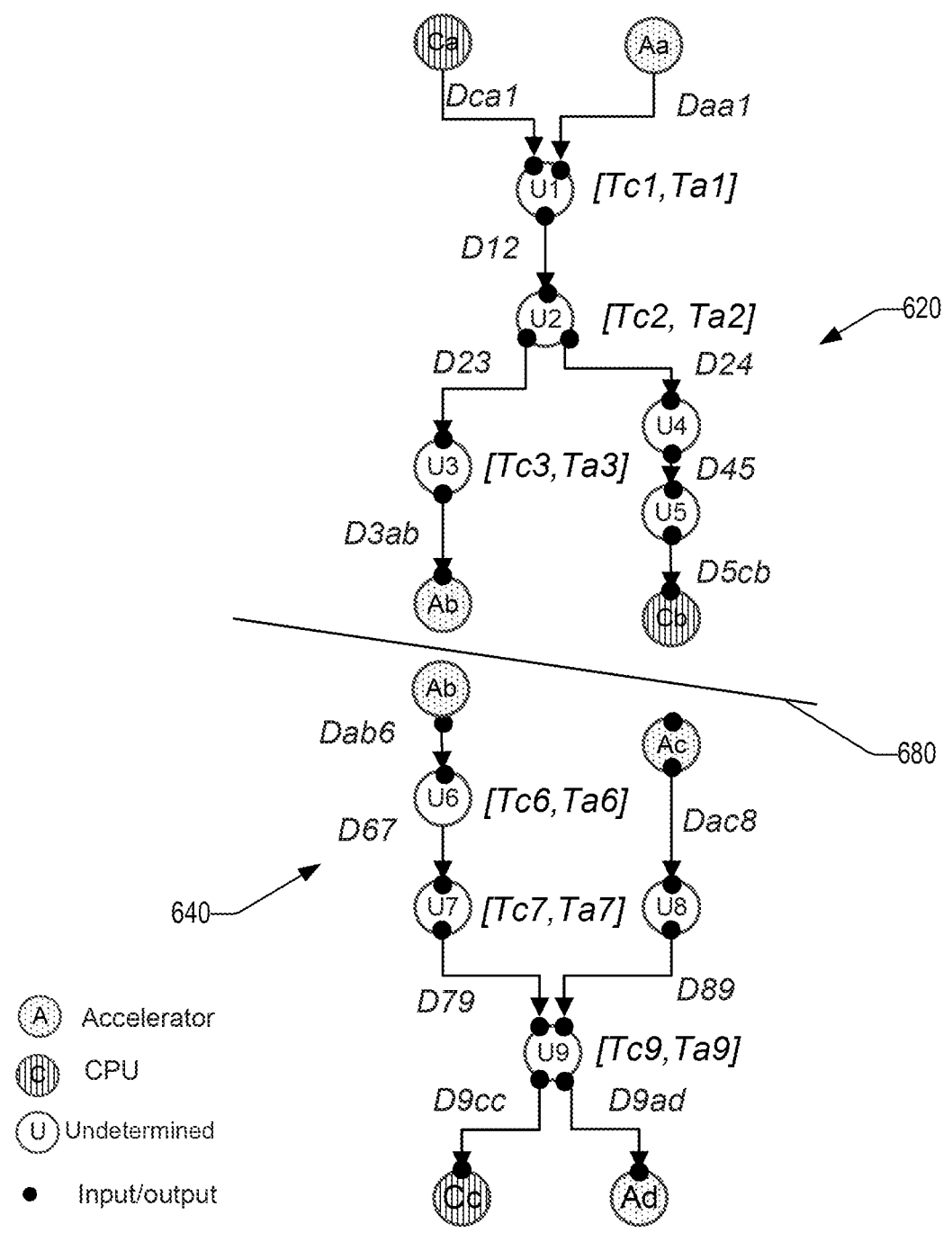
FIG. 6 is a diagrammatic view of the computational graph of FIG. 5 divided into sub-graphs, consistent with embodiments.

The computational graph may be divided 370 into sub-graphs by the processor. FIG. 6 shows the computational graph of FIG. 5 after the processor has determined where to sub-divide the computational graph into sub-graphs 620 and 640 that are demarcated by line 680. Divisions may be located where a CPU operation or an accelerator operation may be connected to an undetermined operation. When sub-divisions are made, the CPU operations and accelerator operations may be designated as vertex operations for the sub-graph. A pruning process may be applied 380 to one or more of the sub-graphs. Examples of pruning processes are described in further detail in FIGS. 7A, 7B, and 8-13. The pruning process reduces the candidates to perform pre-processing step when converting the undetermined processing designated operations, into one of the accelerator designated operations or the CPU designated operations depending on which selection minimizes a number of the pre-processing steps in the sub-graph. Edges of the sub-graphs where pre-processing steps will be performed may be determined 390. The deep learning model may be run 399 using the sub-graphs with undetermined operations being designated for processing by the CPU or accelerator depending on which selection yields the least pre-processing overhead.

Pruning

Figure 7A:
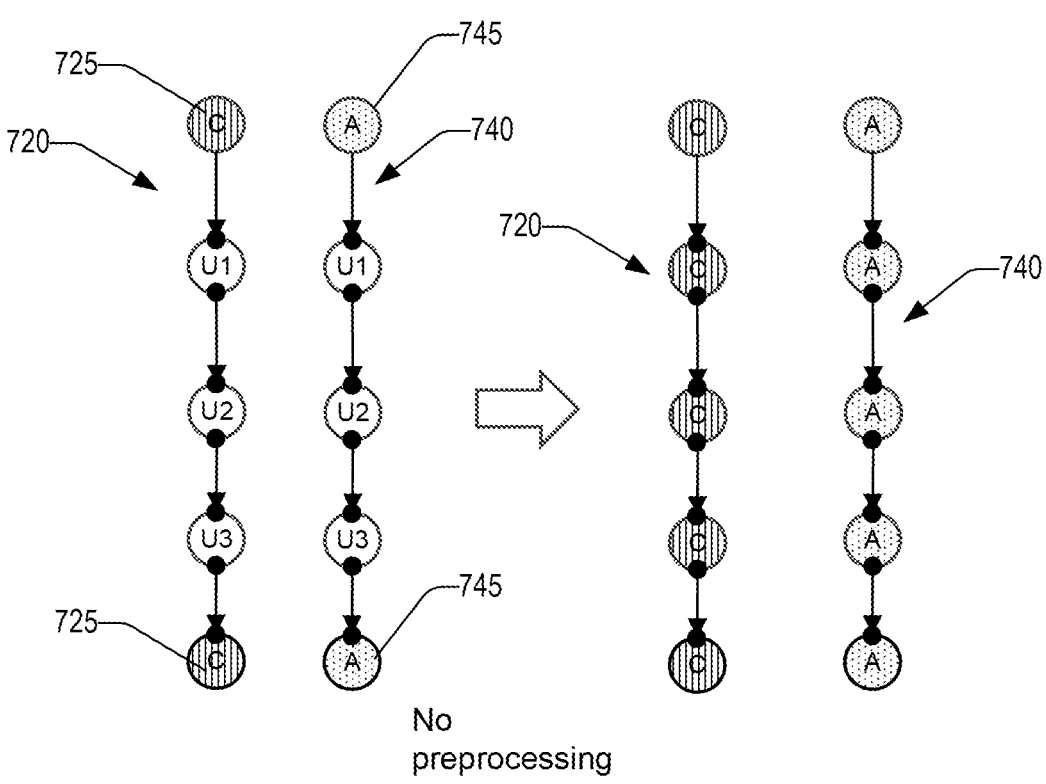
FIG. 7A is a diagrammatic view of a conversion process applied to a sub-graph of an artificial intelligence process using hardware acceleration, consistent with embodiments.
Figure 7B:
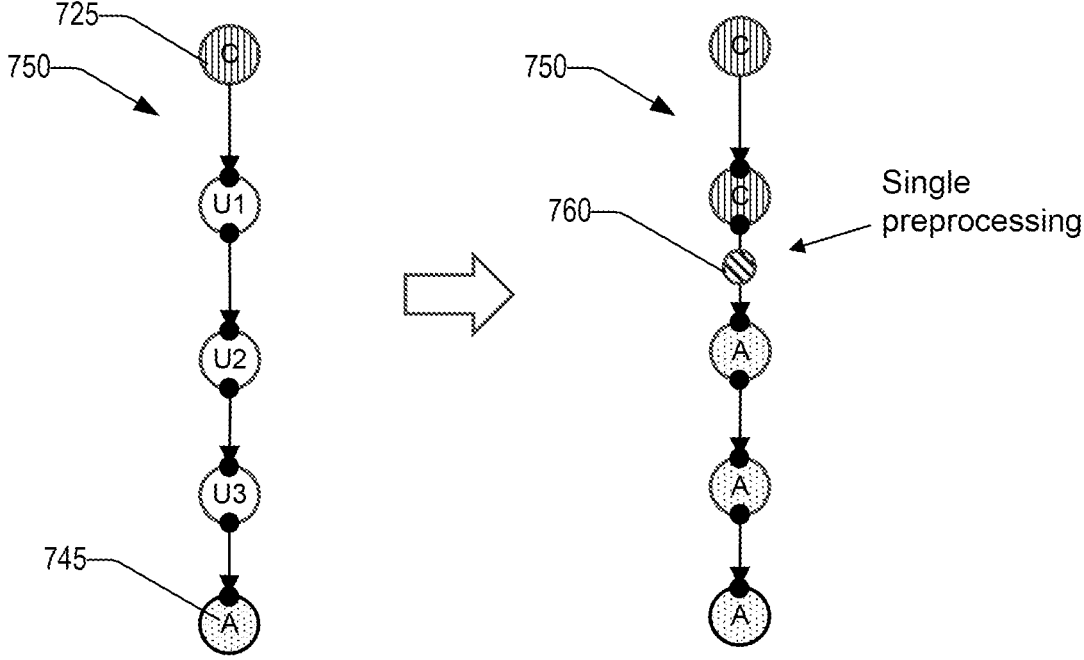
FIG. 7B is a diagrammatic view of a conversion process applied to a sub-graph of an artificial intelligence process using hardware acceleration, consistent with embodiments.

FIGS. 7A and 7B show examples of pruning processes that may be incorporated into embodiments of the subject disclosure. Embodiments may include the following conditions when inserting a minimum number of data preprocessing steps in a subgraph. The performance difference between using the CPU and using the accelerator is not so large in the undetermined operations. Pruning process uses following two conditions. If all vertex operations in the subgraph are in the same group, the processor may set the group in the undetermined operations so that all operations are in the same group. FIG. 7A shows examples of two sub-graphs 720 and 740. Sub-graph 720 has vertices 725 that are both designated for CPU operation. Sub-graph 740 has vertices 745 that are both designated for accelerator operation. Each sub-graph 720 and 740 has undetermined operations between the respective vertices 725 and 745. The undetermined operations in the sub-graph 720 have been converted into nodes designated for CPU operation. Similarly, the undetermined operations in the sub-graph 740 have been converted into nodes designated for accelerator operation. As can be seen, the result provides sub-graphs that do not require pre-processing data because the undetermined operations now match the format requirements of their vertices. Another condition for pruning may include allowing only one preprocessing data node inserted in a path of the sub-graph because multiple pre-processing introduces large overhead. For example, if the condition exists where one of the sub-graphs includes vertices that include one accelerator designated operation and one CPU designated operation (for example, see sub-graph 750 on left side of FIG. 7B), the pruning process converts the undetermined processing designated operations in the sub-graph so that only a single one of the accelerator designated operations is adjacent a single one of the CPU designated operations. (See sub-graph 750 on right side of FIG. 7B). The result provides a single pre-processing data node 760 between an adjacent CPU designated operation and accelerator designated operation. When satisfying these conditions, in the following combination search embodiment, the processor doesn't evaluate the case, resulting in reducing the candidates to insert in the pre-processing step.

Combination Search

Figure 8:
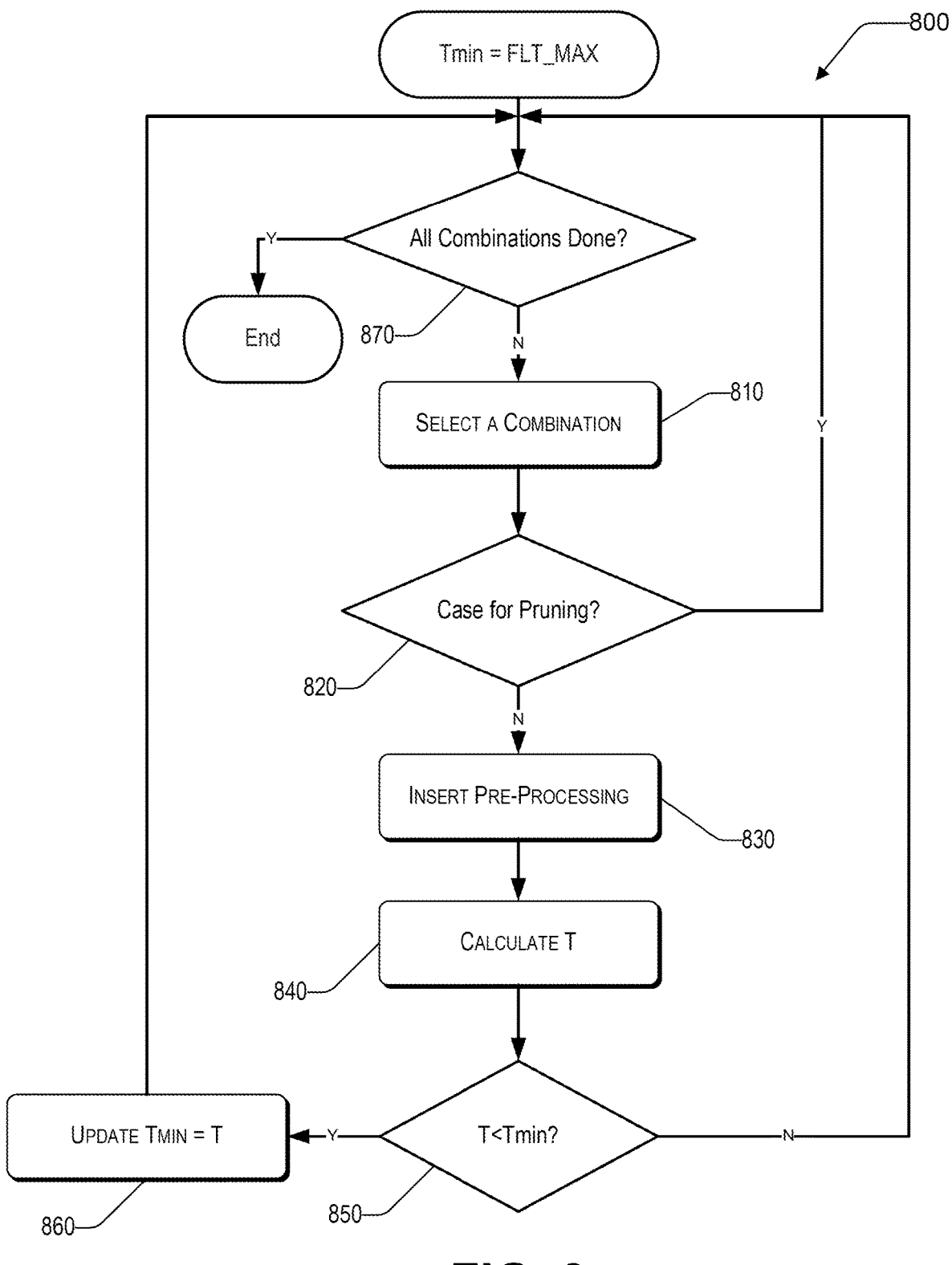
FIG. 8 is a flowchart of a method for applying a combination search process to a sub-graph, consistent with embodiments.
Figure 9:
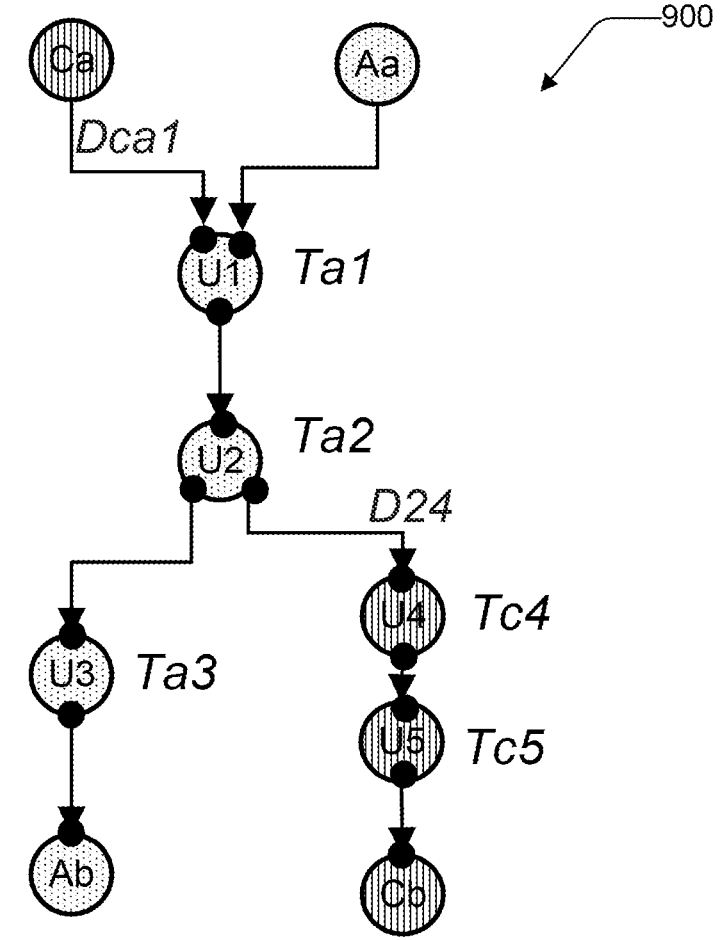
FIG. 9 is a diagrammatic view of a sub-graph depicting application of a combination search process, according to an embodiment.

FIG. 8 shows a method 800 using a combination search process. The method 800 should be viewed concurrently with FIG. 9, which depicts a sub-graph 900 after a combination search process has been applied. The combination search may begin by selecting 810 a plurality of combinations of the accelerator designated operation and the CPU designated operation for one or more of the undetermined processing designated operations in one of the sub-graphs. FIG. 9 shows a sub-graph where some of the undetermined operations have been temporarily designated for accelerator operation and other undetermined operations have been temporarily designated for CPU operation. It will be understood that iterations of the combination selection process may switch these designations into more than just the combination shown, and in some embodiments include all possible permutations. The processor may determine 820 whether the combination being assessed for an undetermined operation satisfies the conditions for pruning. If not, the processor may insert 830 temporary pre-processing steps at the edges of the sub-graph whose operations are different types; for example, the edges include the accelerator designated operation and the CPU designated operation. The processor may determine (calculate) 840 an elapsed time for processing through a path of the sub-graph where the path includes the temporary pre-processing steps and the undetermined processing designated operations using different selected combinations of the accelerator designated operation and the CPU designated operation. For each combination of operation designations, the processor may check if the latest combination's elapsed time is less than a current lowest elapsed time for a selected combination. As a lower elapsed time is achieved, the new lowest time may be recorded 860. When all combinations have been exhausted 870, the processor may select the combination of the accelerator designated operations and the CPU designated operations, that demonstrates a lowest elapsed time.

Minimum Cut

Figure 10:
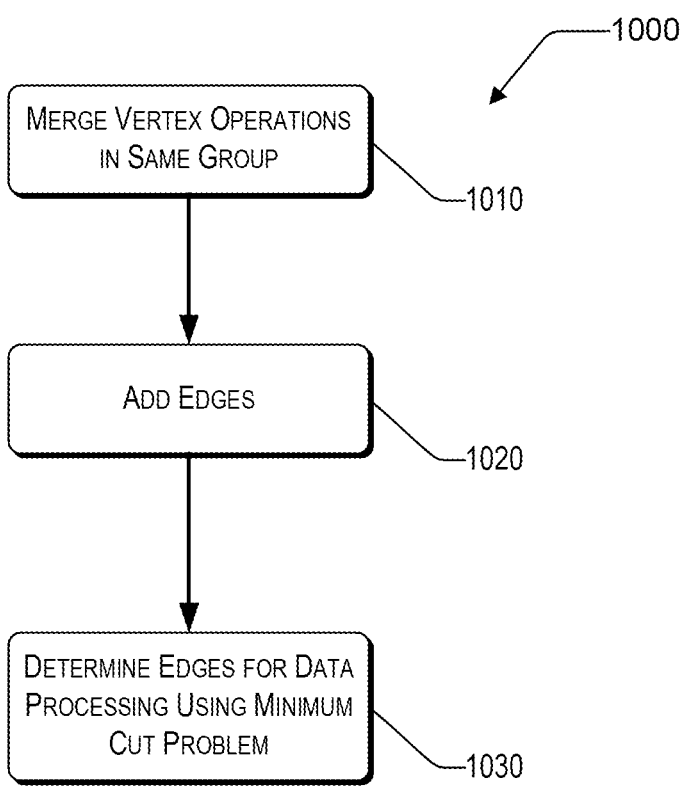
FIG. 10 is a flowchart of a method for applying a minimum cut process to a sub-graph, consistent with embodiments.
Figure 11:
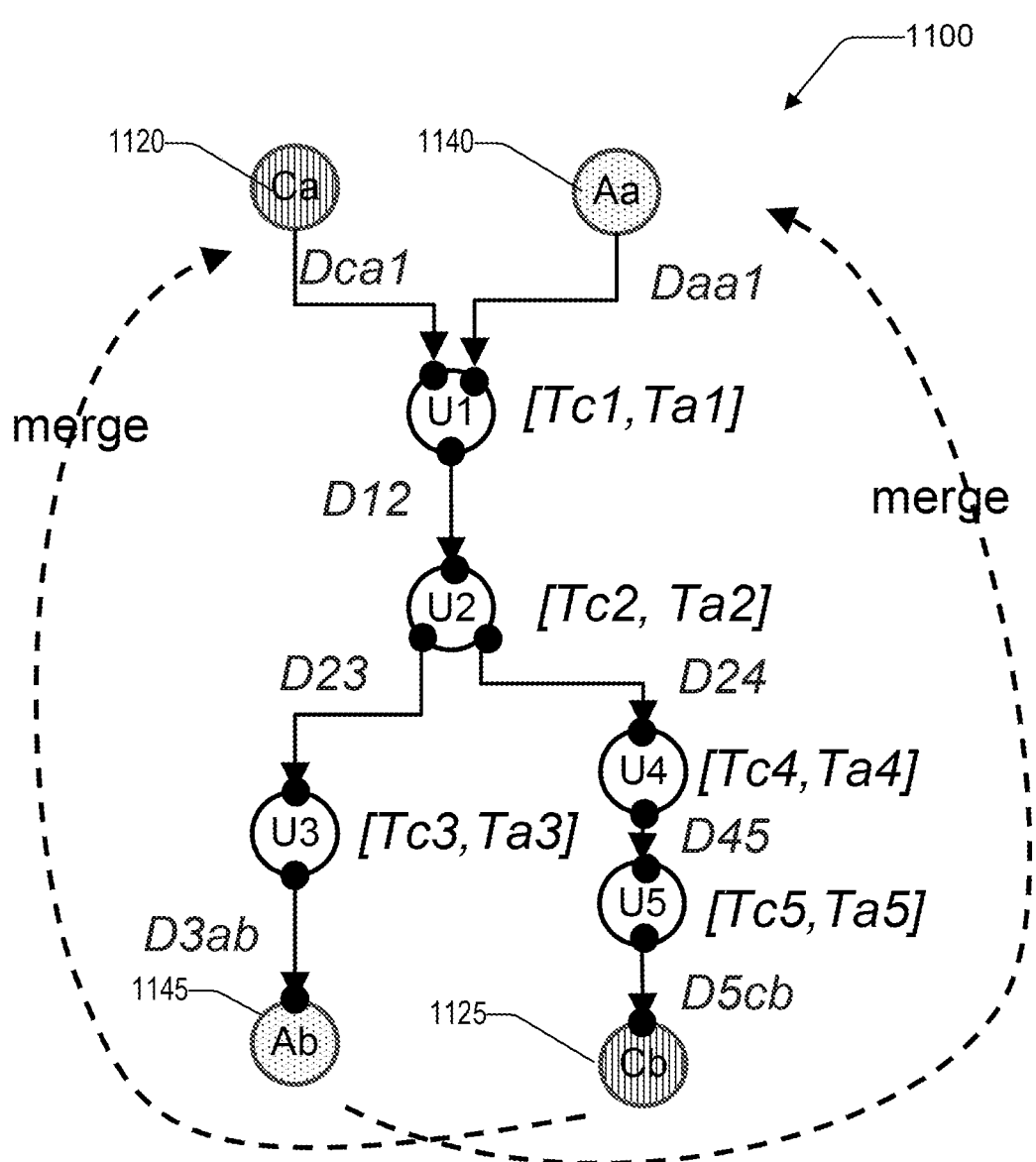
FIG. 11 is a diagrammatic view of a sub-graph depicting part of an application of a minimum cut process, according to an embodiment.
Figure 12:
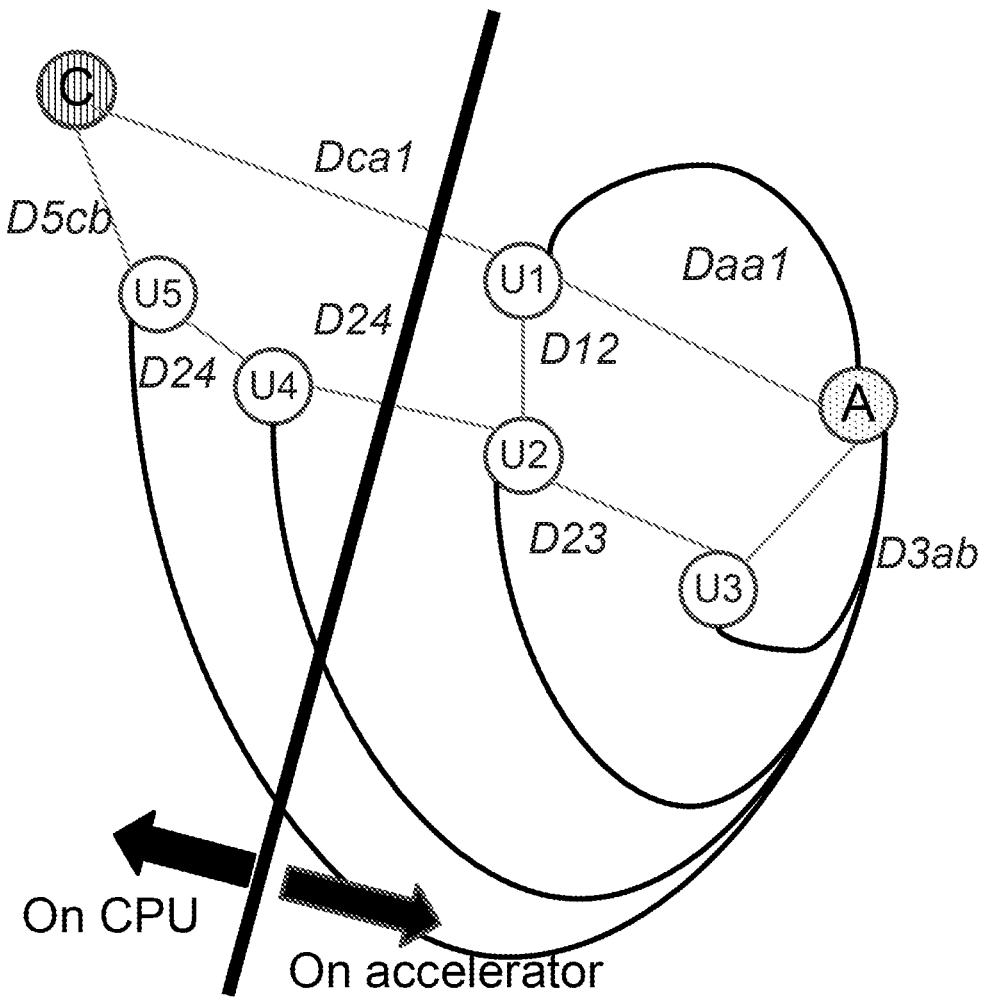
FIG. 12 is a diagrammatic view of a sub-graph depicting part of an application of a minimum cut process, according to an embodiment.
Figure 13:
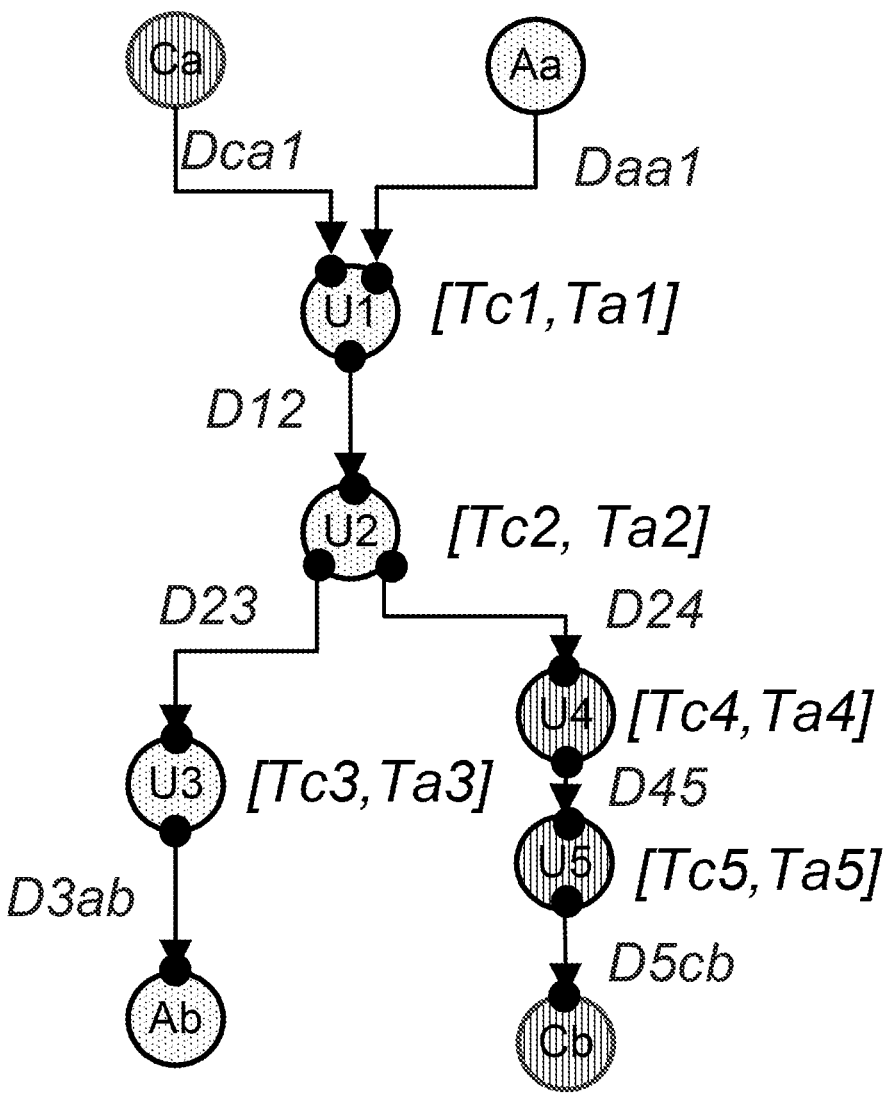
FIG. 13 is a diagrammatic view of a sub-graph depicting a result of an application of a minimum cut process, according to an embodiment.

FIG. 10 shows a method 1000 using a minimum cut process. The method 1000 should be viewed concurrently with FIGS. 11-13, which depicts a sub-graph 1100 being transformed so that the undetermined operations provide a more efficient use of the accelerator element. In the sub-graph 1100, vertices that are either both accelerator designated operations or CPU designated operations may be associated (merged) 1010 as being ends of a same sub-graph. See also FIG. 11, which shows the computational path from CPU operation vertex 1120 being merged with the CPU operation vertex 1125. Similarly, accelerator operation vertex 1140 is merged into a path with accelerator operation vertex 1145. The processor may determine 1020 a computation time from each undetermined processing designated operation to each end in the sub-graph of merged vertices. For example, the computation time may be substantially similar (e.g., equal to) a processing time from individual undetermined processing designated operations to one of the accelerator designated operations at the ends of the same sub-graph. Likewise, the computation time may be substantially similar to (e.g., equal to) a processing time from individual undetermined processing designated operations to one of the CPU designated operations at the ends of the same sub-graph. FIG. 12 shows a representation of computation time calculations from individual undetermined operation nodes to a CPU operation vertex and to an accelerator operation vertex. In FIG. 12, "D" represents the cost for data preprocessing. Each line from an undetermined operation "U" to a vertex represents the calculation for a cost for computation, Tc–Ta. When the edge, "Tc4–Ta4" is cut, U4 is executed on the CPU; if U4 is much faster on the accelerator, the cost, "Tc4–Ta4" is greater. The processor may determine 1030 the edges of the sub-graphs where the pre-processing steps will be performed based on solving a minimum cut problem using the computation time of the individual undetermined processing designated operations. FIG. 13 shows a final result of the sub-graph from FIG. 11 having been transformed with undetermined operations being re-designated as either accelerator operations or CPU operations based on the computation times from the minimum cut problem being solved.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer program product for accelerating inference performance in an artificial intelligence model, the computer program product comprising:

one or more computer readable storage media, and program instructions collectively stored on the one or more computer readable storage media, the program instructions comprising:

receiving, by a processor, a plurality of operations associated with the artificial intelligence model;

generating, by the processor, a computational graph for the artificial intelligence model;

categorizing, by the processor, each operation of the plurality of operations into one of three categories including:

accelerator designated operations;

central processing unit (CPU) designated operations; and undetermined processing designated operations;

determining, by the processor, an estimated processing time for each operation of the plurality of operations;

inserting, by the processor, the plurality of operations into the computational graph;

dividing, by the processor, the computational graph into a plurality of sub-graphs;

determining, by the processor, edges of the plurality of sub-graphs where pre-processing steps will be performed; and converting, by the processor, in one or more sub-graphs of the plurality of sub-graphs, the undetermined processing designated operations, into one of the accelerator designated operations or the CPU designated operations, based on a condition that reduces a number of the pre-processing steps in the one or more sub-graphs of the plurality of sub-graphs, wherein the accelerator designated operations are executed by an accelerator, and wherein the CPU designated operations are executed by a CPU.

2. The computer program product of claim 1, wherein the dividing of the computational graph into the plurality of sub-graphs is performed at a point in the computational graph where one of the accelerator designated operations or the CPU designated operations is adjacent to one of the undetermined processing designated operations.

3. The computer program product of claim 1, wherein, upon determining that one sub-graph of the plurality of sub-graphs includes vertices that are the accelerator designated operations, the conversion converts all the undetermined processing designated operations in the sub-graph of the plurality of sub-graphs into the accelerator designated operations.

4. The computer program product of claim 1, wherein, upon determining that one sub-graph of the plurality of sub-graphs includes vertices that are the CPU designated operations, the conversion converts all the undetermined processing designated operations in the sub-graph of the plurality of sub-graphs into the CPU designated operations.

5. The computer program product of claim 1, wherein, upon determining that one sub-graph of the plurality of sub-graphs includes vertices that include one accelerator designated operation and one CPU designated operation, the conversion converts the undetermined processing designated operations in the sub-graph of the plurality of sub-graphs so that only a single one of the accelerator designated operations is adjacent to a single one of the CPU designated operations.

6. The computer program product of claim 1, wherein the program instructions further comprise:

selecting a plurality of combinations of the accelerator designated operations and the CPU designated operations for one or more of the undetermined processing designated operations in one sub-graph of the plurality of sub-graphs;

inserting one or more temporary pre-processing steps at the edges of the plurality of sub-graphs, wherein the edges of the plurality of sub-graphs include the accelerator designated operations and the CPU designated operations;

determining an elapsed time for processing through a path of the sub-graph of the plurality of sub-graphs, wherein the path of the sub-graph of the plurality of sub-graphs includes the one or more temporary pre-processing steps and the undetermined processing designated operations using different selected combinations of the accelerator designated operations and the CPU designated operations; and selecting a combination of the different selected combinations of the accelerator designated operations and the CPU designated operations, that demonstrates a lowest elapsed time.

7. The computer program product of claim 1, wherein for the division of the computational graph into the plurality of sub-graphs, the program instructions further comprise:

associating vertices that are either the accelerator designated operations or the CPU designated operations as being ends of a same sub-graph;

determining a computation time from each undetermined processing designated operation to each end in the same sub-graph, wherein the computation time equals a processing time from an individual undetermined processing designated operation to:

one of the accelerator designated operations at the ends of the same sub-graph; and one of the CPU designated operations at the ends of the same sub-graph; and determining the edges of the plurality of sub-graphs where the pre-processing steps will be performed based on solving a minimum cut problem using the computation time of the individual undetermined processing designated operation.

8. A method for accelerating inference performance in an artificial intelligence model, comprising:

receiving, by a processor, a plurality of operations associated with the artificial intelligence model;

generating, by the processor, a computational graph for the artificial intelligence model;

categorizing, by the processor, each operation of the plurality of operations into one of three categories including:

accelerator designated operations;

central processing unit (CPU) designated operations; and undetermined processing designated operations;

determining, by the processor, an estimated processing time for each operation of the plurality of operations;

inserting, by the processor, the plurality of operations into the computational graph;

dividing, by the processor, the computational graph into a plurality of sub-graphs;

determining, by the processor, edges of the plurality of sub-graphs where pre-processing steps will be performed; and converting, by the processor, in one or more sub-graphs of the plurality of sub-graphs, the undetermined processing designated operations, into one of the accelerator designated operations or the CPU designated operations, based on a condition that minimizes a number of the pre-processing steps in the one or more sub-graphs of the plurality of sub-graphs, wherein the accelerator designated operations are executed by an accelerator, and wherein the CPU designated operations are executed by a CPU.

9. The method of claim 8, wherein the dividing of the computational graph into the plurality of sub-graphs is performed at a point in the computational graph where one of the accelerator designated operations or the CPU designated operations is adjacent to one of the undetermined processing designated operations.

10. The method of claim 8, wherein, upon determining that one sub-graph of the plurality of sub-graphs includes vertices that are the accelerator designated operations, the conversion converts all the undetermined processing designated operations in the sub-graph of the plurality of sub-graphs into the accelerator designated operations.

11. The method of claim 8, wherein, upon determining that one sub-graph of the plurality of sub-graphs includes vertices that are the CPU designated operations, the conversion converts all the undetermined processing designated operations in the sub-graph of the plurality of sub-graphs into the CPU designated operations.

12. The method of claim 8, wherein, upon determining that one sub-graph of the plurality of sub-graphs includes vertices that include one accelerator designated operation and one CPU designated operation, the conversion converts the undetermined processing designated operations in the sub-graph of the plurality of sub-graphs so that only a single one of the accelerator designated operations is adjacent to a single one of the CPU designated operations.

13. The method of claim 8, further comprising:

selecting a plurality of combinations of the accelerator designated operations and the CPU designated operations for one or more of the undetermined processing designated operations in one sub-graph of the plurality of sub-graphs;

inserting one or more temporary pre-processing steps at the edges of the plurality of sub-graphs, wherein the edges of the plurality of sub-graphs include the accelerator designated operations and the CPU designated operations;

determining an elapsed time for processing through a path of the sub-graph of the plurality of sub-graphs, wherein the path of the sub-graph of the plurality of sub-graphs includes the one or more temporary pre-processing steps and the undetermined processing designated operations using different selected combinations of the accelerator designated operations and the CPU designated operations; and selecting a combination of the different selected combinations of the accelerator designated operations and the CPU designated operations, that demonstrates a lowest elapsed time.

14. The method of claim 8, wherein for the division of the computational graph into the plurality of sub-graphs, the method further comprises:

associating vertices that are either both the accelerator designated operations or the CPU designated operations as being ends of a same sub-graph;

determining a computation time from each undetermined processing designated operation to each end in the same sub-graph, wherein the computation time equals a processing time from an individual undetermined processing designated operation to:

one of the accelerator designated operations at the ends of the same sub-graph; and

one of the CPU designated operations at the ends of the same sub-graph; and determining the edges of the plurality of sub-graphs where the pre-processing steps will be performed based on solving a minimum cut problem using the computation time of the individual undetermined processing designated operation.

15. A computing device configured to accelerate inference performance in an artificial intelligence model, comprising:

a processor; and a memory coupled to the processor, the memory storing instructions to cause the processor to perform acts comprising:

receiving a plurality of operations associated with the artificial intelligence model;

generating a computational graph for the artificial intelligence model;

categorizing each operation of the plurality of operations into one of three categories including:

accelerator designated operations;

central processing unit (CPU) designated operations; and undetermined processing designated operations;

determining an estimated processing time for each operation of the plurality of operations;

inserting the plurality of operations into the computational graph;

dividing the computational graph into a plurality of sub-graphs;

determining edges of the plurality of sub-graphs where pre-processing steps will be performed; and converting, in one or more sub-graphs of the plurality of sub-graphs, the undetermined processing designated operations, into one of the accelerator designated operations or the CPU designated operations, based on a condition that reduces a number of the pre-processing steps in the one or more sub-graphs of the plurality of sub-graphs, wherein the accelerator designated operations are executed by an accelerator, and wherein the CPU designated operations are executed by a CPU.

16. The computing device of claim 15, wherein the dividing of the computational graph into the plurality of sub-graphs is performed at a point in the computational graph where one of the accelerator designated operations or the CPU designated operations is adjacent to one of the undetermined processing designated operations.

17. The computing device of claim 15, wherein, upon determining that one sub-graph of the plurality of sub-graphs includes vertices that are the accelerator designated operations, the conversion converts all the undetermined processing designated operations in the sub-graph of the plurality of sub-graphs into the accelerator designated operations.

18. The computing device of claim 15, wherein, upon determining that one sub-graph of the plurality of sub-graphs includes vertices that are the CPU designated operations, the conversion converts all the undetermined processing designated operations in the sub-graph of the plurality of sub-graphs into the CPU designated operations.

19. The computing device of claim 15, wherein, upon determining that one sub-graph of the plurality of sub-graphs includes vertices that include one accelerator designated operation and one CPU designated operation, the conversion converts the undetermined processing designated operations in the sub-graph of the plurality of sub-graphs so that only a single one of the accelerator designated operations is adjacent to a single one of the CPU designated operations.

20. The computing device of claim 15, wherein the instructions cause the processor to perform acts further comprising:

selecting a plurality of combinations of the accelerator designated operations and the CPU designated operations for one or more of the undetermined processing designated operations in one sub-graph of the plurality of sub-graphs;

inserting one or more temporary pre-processing steps at the edges of the plurality of sub-graphs, wherein the edges of the plurality of sub-graphs include the accelerator designated operations and the CPU designated operations;

determining an elapsed time for processing through a path of the sub-graph of the plurality of sub-graphs, wherein the path of the sub-graph of the plurality of sub-graphs includes the one or more temporary pre-processing steps and the undetermined processing designated operations using different selected combinations of the accelerator designated operations and the CPU designated operations; and selecting a combination of the different selected combinations of the accelerator designated operations and the CPU designated operations, that demonstrates a lowest elapsed time.

* * * * *